United States Patent
Yano

(10) Patent No.: US 7,286,619 B2
(45) Date of Patent: Oct. 23, 2007

(54) CDM RECEIVER APPARATUS AND RAKE SYNTHESIZER APPARATUS

(75) Inventor: Motomitsu Yano, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 954 days.

(21) Appl. No.: 10/390,775

(22) Filed: Mar. 19, 2003

(65) Prior Publication Data

US 2003/0179733 A1  Sep. 25, 2003

(30) Foreign Application Priority Data

Mar. 22, 2002  (JP) .............................. 2002-081989

(51) Int. Cl.
*H04L 1/02* (2006.01)
(52) U.S. Cl. ....................... 375/347; 375/316; 375/349; 370/441
(58) Field of Classification Search .............. 375/130, 375/131, 136, 137, 147, 148, 149, 316, 340, 375/343, 346, 347, 349, 350; 370/310, 315, 370/316, 319, 320, 328, 329, 335, 342, 431, 370/441; 329/316

See application file for complete search history.

(56) References Cited

U.S. PATENT DOCUMENTS 5,671,221 A * 9/1997 Yang ........................... 370/320
5,754,599 A * 5/1998 Ling et al. ................... 375/340
6,229,840 B1 * 5/2001 Ichihara ....................... 375/147
6,442,193 B1 * 8/2002 Hirsch ......................... 375/147
6,496,534 B1 * 12/2002 Shimizu et al. ............. 375/148
6,922,434 B2 * 7/2005 Wang et al. ................. 375/148
2001/0017883 A1 * 8/2001 Tiirola et al. ................ 375/148
2002/0159507 A1 * 10/2002 Flaig et al. .................. 375/148

* cited by examiner

Primary Examiner—Jay K. Patel
Assistant Examiner—Naheed Ejaz
(74) Attorney, Agent, or Firm—Oblon, Spivak, McClelland, Maier & Neustadt, P.C.

(57) ABSTRACT

The SIR values of multi-paths obtained by a transmission path estimator are accumulated by an integrator at very cycle of a pilot signal, an average value for sufficiently long period is calculated by an average value calculator, a reference value is divided by a divider and applied as a control coefficient to multipliers, where it is multiplied by the SIR values, and the weight values of multi-paths are obtained. As for the despreaded data from a despreading unit, the timing of all data is synchronized in buffers, the data is complex multiplied by the above-mentioned weight values in multipliers, and RAKE is synthesized by adding in an adder, and outputted as final demodulated data to a soft decision unit.

8 Claims, 4 Drawing Sheets

CDM RECEIVER APPARATUS AND RAKE SYNTHESIZER APPARATUS

CROSS-REFERENCE TO RELATED APPLICATIONS

This application is based upon and claims the benefit of priority from the prior Japanese Patent Application No. 2002-081989, filed Mar. 22, 2002, the entire contents of which are incorporated herein by reference.

BACKGROUND OF THE INVENTION

1. Field of the Invention

The present invention relates to a CDM (Code Division Multiplex) receiver apparatus in a communication or broadcasting system using a CDM method, and a RAKE synthesizer apparatus used for the CDM receiver apparatus.

2. Description of the Related Art

In a CDM transmitter and a CDM receiver apparatus in a communication or broadcasting system using a CDM method, the following operations are usually performed. A CDM transmitter adds an error correction code to each transmission data of a plurality of channels, generates a CDM signal by spreading the data by a spreading code different for each channel and multiplying the data, and sends out the CDM signal. A CDM receiver apparatus performs AGC (Auto Gain Control) for the received CDM signal depending on the average receiving power, and then despreading demodulates the signal by using a spreading code of the specified channel, makes soft decision and corrects an error to thereby obtain the transmission data of a specified channel. A CDM receiver apparatus usually uses a RAKE synthesizer apparatus as a back diffusion demodulator.

However, in a despreading demodulator used in a conventional CDM receiver apparatus, the average amplitude (power) of output data does not always match the power level of input signal because of the influence of spreading and demodulating the signal by using the spreading code. Thus, even if the input power level of the despreading demodulator by performing AGC based on the average receiving power, the average amplitude of demodulated data is not fixed. As a result, the accuracy of soft decision lowers, and the error rate rises.

BRIEF SUMMARY OF THE INVENTION

An object of the present invention is to provide a CDM receiver apparatus which can control the average amplitude of despreaded demodulated data to be an optimum value as a soft decision decoding input, to thereby increase the accuracy of soft decision and decrease the error rate, and a RAKE synthesizer apparatus used in the CDM receiver apparatus.

A CDM receiver apparatus, which receives a CDM radio signal obtained by encoding each information/data signal of a plurality of channels for correction of an error and spreading, modulating and multiplying each signal by using a spreading code different for each channel, according to the present invention comprises: a receiver which receives a CDM radio signal; a frequency converter which converts the CDM radio signal into a base band CDM signal; a transmission path estimator which estimates multi-path characteristics of a transmission path from the base band CDM signal, selects a plurality of paths from the result of estimation, and obtains a delay time and a signal-to-interference ratio for each path; a despreading unit which shifts the phase of the spreading code of a specified channel out of spreading codes different for each channel, based on the delay time of the corresponding path obtained by the transmission path estimator, with respect to the plurality of paths selected by the transmission path estimator, and despreades the base band CDM signal to obtain despreaded data; a weight value generator which accumulates and averages signal-to-interference ratios of a plurality of paths obtained by the transmission path estimator, and multiplies the signal-to-interference ratios of the plurality of paths by a coefficient inversely proportional to the average value, to obtain a weight value for each path; a synthesizer which obtains demodulated data by synthesizing the despreaded data of the plurality of paths obtained by the despreading unit, by weighing by the weight value of the corresponding path; and a soft decision decoder which obtains decoded data by soft decision decoding the demodulated data obtained by the synthesizer.

A RAKE synthesizer apparatus used in the above the CDM receiver apparatus according to the present invention comprises: a weight value generator which calculates a weight value for each path by accumulating and averaging signal-to-interference ratios of a plurality of paths obtained by the transmission path estimator, and multiplying the signal-to-interference ratios of the plurality of paths by a coefficient inversely proportional to the average value; and a synthesizer which obtains demodulated data by synthesizing the back despreaded data of a plurality of paths obtained by the despreading unit by weighing by the weight value of the corresponding path.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

Hereinafter, embodiments of the present invention will be explained in detail with reference to the attached drawings.

Figure 1:
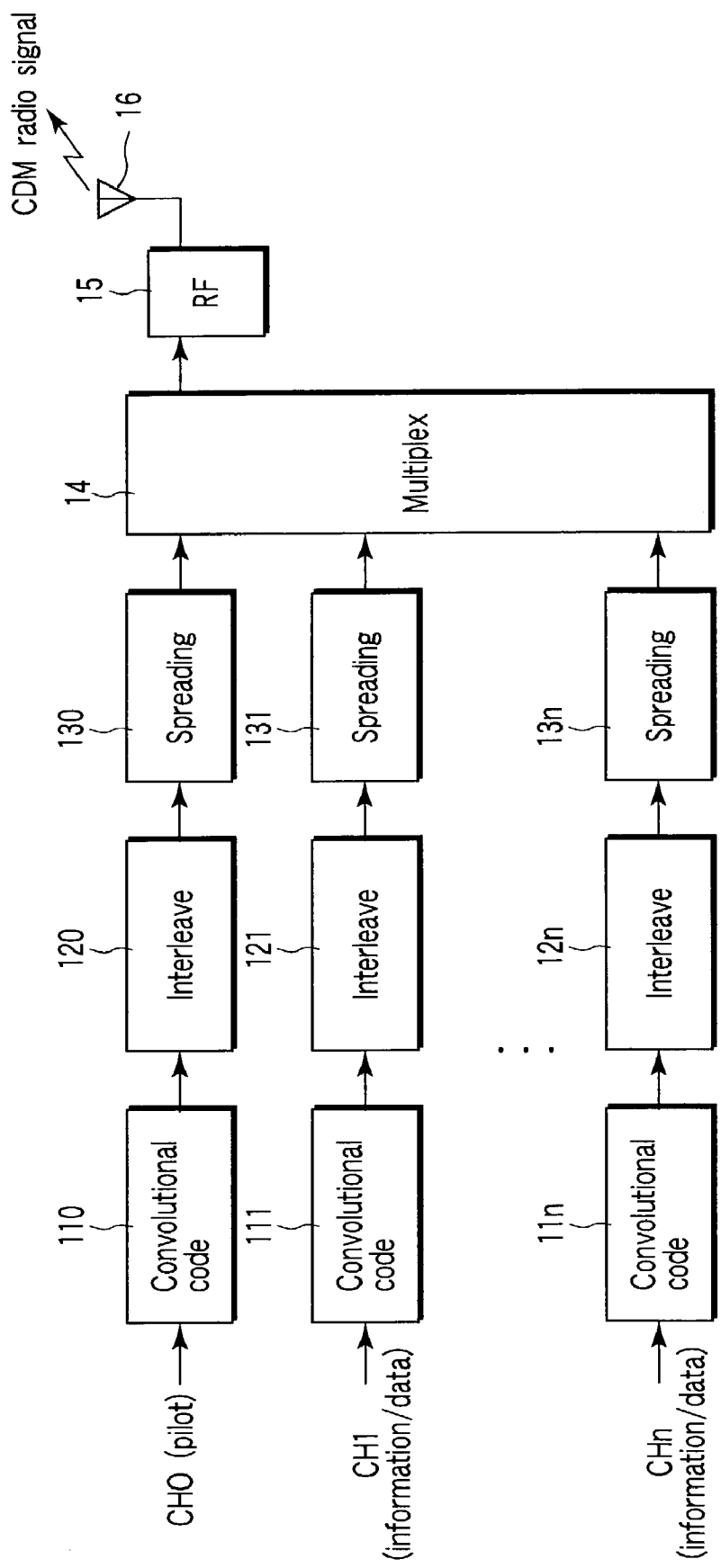
FIG. 1 is a block diagram showing a configuration example of a CDM transmitter, to which the present invention is applied.

FIG. 1 is a block diagram showing a configuration of a CDM transmitter in a communication or broadcasting system, to which the present invention is applied. The CDM transmitter shown in FIG. 1 has a pilot channel CH0 and 1st to nth information channels CH1-CHn. A pilot signal inputted from the pilot channel CH0 is a data signal generated by periodically repeating a string of known data such as a 11 "1". The pilot signal and information/data signal of each channel CH0-CHn is convolutional encoded by each convolutional encoder 110-11n. This is done to correct an error in the receiver side. Then, the order of data is changed by interleave processors 120-12n (primary modulation). This is done to randomize an error occurred in a radio transmission path. Further, the data is spreaded and modulated by a spreading code made of a pseudo random code such as M-series, in spreading units 130-13n (secondary modulation). The spreaded modulated signal of each channel CH0-CHn is multiplied by a multiplier 14, converted into a RF band by a RF processor 15, and sent out as a CDM radio signal from a transmitter antenna 16.

Figure 2:
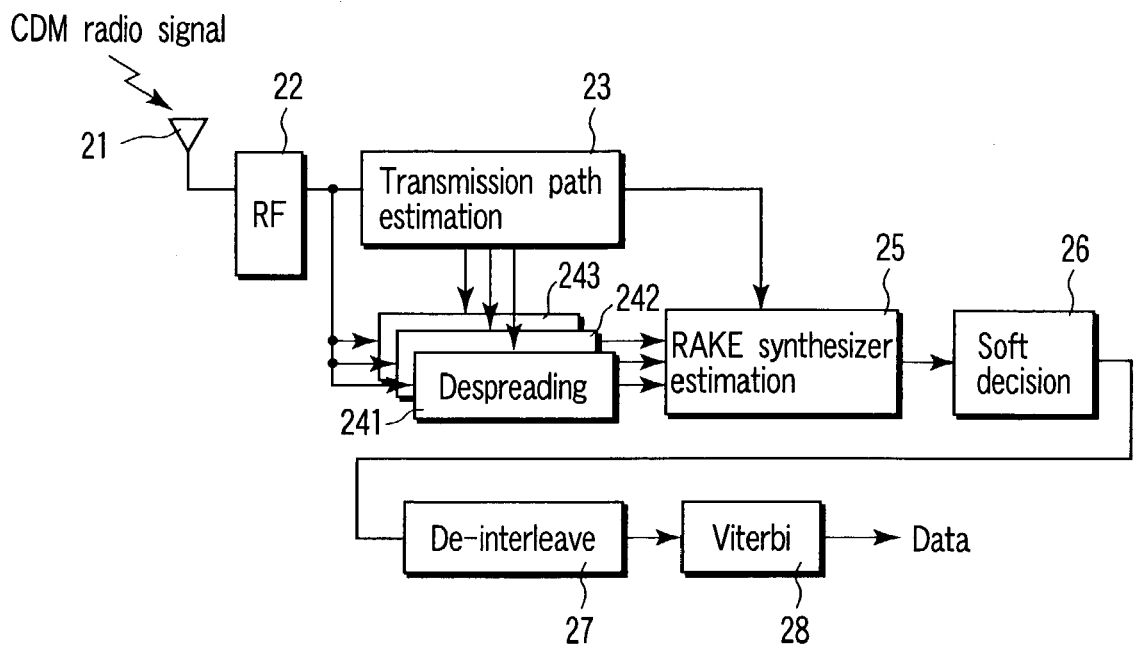
FIG. 2 is a block diagram showing a configuration of one embodiment of a CDM receiver apparatus according to the present invention.

FIG. 2 is a block diagram showing a configuration of a CDM receiver apparatus, to which the present invention is applied. In FIG. 2, a CDM radio signal received by a receiving antenna 21 is converted into a base band signal by a RF processor 22, and supplied to a transmission path estimator 23 and despreading units 241-243.

The above-mentioned transmission path estimator 23 uses a pseudo random code assigned to a pilot channel as a reference signal, correlates the reference signal with the base band signal in the time series of one pilot signal cycle, and estimates from the result of correlation the delay time of a multi-path occurred in the radio transmission path and the power level.

Figure 3:
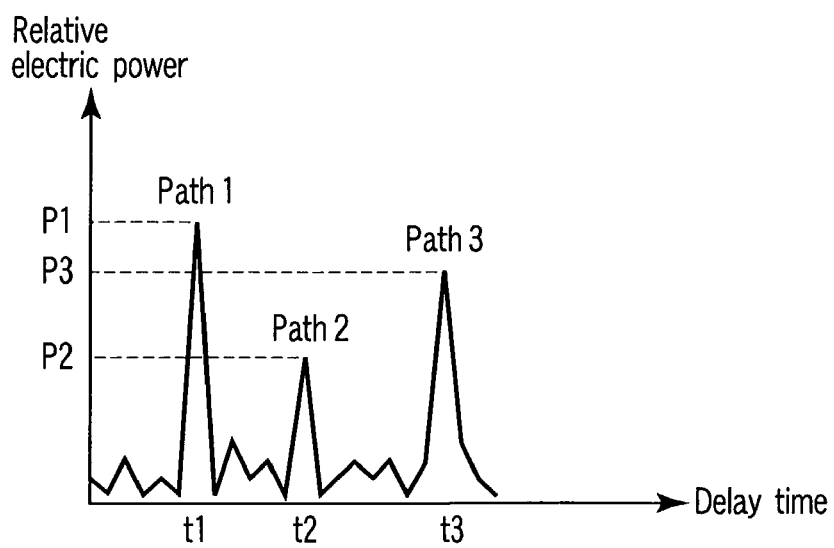
FIG. 3 is a graph showing the distribution of multi-paths for explaining estimation of a transmission path in the CDM receiver apparatus of the above embodiment.

FIG. 3 shows a result of the above-mentioned estimation of a transmission path. FIG. 3 shows the case where three paths 1-3 are generated at the receiving point of the CDM receiver apparatus. In this case, the transmission path estimator 23 calculates the delay time t1-t3 of three paths 1-3, and calculates from the correlative power P1-P3 signal-to-interference ratios (SIR, hereinafter) PS1-PS3. SIR is the ratio of desired signal power to interference signal power. The SIR value PS1 of path 1 is expressed by PS1=P1/(P2+P3), the SIR value PS2 of path 2 is expressed by PS2=P2/(P1+P3) and the SIR value of path 3 is expressed by PS3=P3/(P1+P2). The transmission path estimator 23 informs the back diffusion units 241-243 of the delay time t1-t3 of three paths 1-3, and informs the RAKE synthesizer apparatus 25 of the SIR values PS1-PS3. In this embodiment, when there are four or more multi-paths, the transmission path estimator 23 will select the higher order three paths having a large correlation power.

The despreading units 241-243 generate a pseudo random code corresponding to each specified channel, shift the phase of a pseudo random code based on the delay time t1-t3 of paths 1-3 from the transmission path estimator 23, and multiply it by a base band signal to obtain the despreaded data of paths 1-3. The RAKE synthesizer apparatus 25 adjusts the timing of the despreaded data of paths 1-3, and then synthesizes the despreaded data of paths 1-3 by weighing based on the SIR values PS1-PS3 of paths 1-3 informed by the transmission estimator 23. This provides demodulated data.

The demodulated data outputted from the RAKE synthesizer apparatus 25 is softly decided by the soft decision unit 26, and sent to the de-interleave processor 27 where the order of data changed by interleaving in the transmitter side is restored to the original order, and sent to a Viterbi decoder 28 where the error is corrected and decoded, thereby the information data signal of the specified channel is regenerated.

Figure 4:
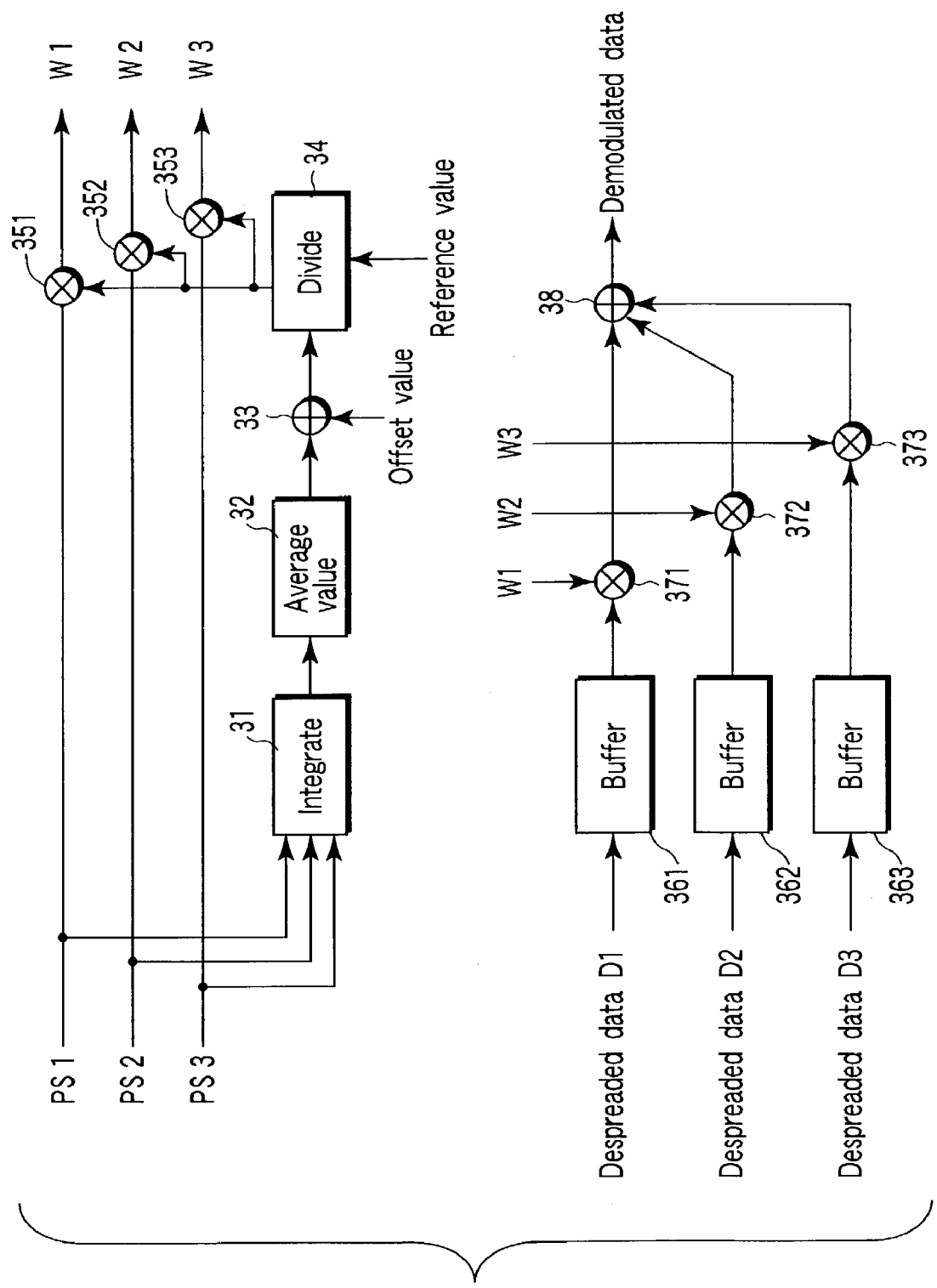
FIG. 4 is a block diagram showing a configuration example of a RAKE synthesizer apparatus used in the above embodiment.

FIG. 4 is a block diagram showing a concrete configuration of the above-mentioned RAKE synthesizer apparatus 25. In FIG. 4, the SIR values PS1-PS3 of paths 1-3 entered from the transmission path estimator 23 are applied to an integrator 31 where the values are accumulated at every cycle of the pilot signal, and applied to an average value calculator 32 where an average value for sufficiently long period is calculated. This SIR average value is applied to an adder 33 where an offset value is added, and the value is supplied to a divider 34. The divider 34 calculates a preset reference value. The result of calculation made by the divider 34, or the coefficient inversely proportional to the average value on the basis of the reference value, is supplied as a control coefficient to multipliers 351-353, where it is multiplied by the SIR values PS1-PS3 of paths 1-3. The results of multiplication are outputted as weight values W1-W3 of paths 1-3. It is noted that the reference value is the SIR value where the average of soft decision becomes optimum, and shall be predetermined.

On the other hand, the despreaded data D1-D3 from the despreading unit 24 absorb a delay time difference in buffers 361-363, to thereby synchronize the timing of all data. For example, in the case of multi-path shown in FIG. 3, the spreaded data D1 is delayed by (t3-t1) time in the buffer 361, the spreaded data D2 is delayed by (t2-t3) time in the buffer 362. The spreaded data D3 is delayed most, and its delay time in the buffer 363 can be 0.

The spreaded data D1-D3, which are mutually synchronized by the above buffers 361-363, are complex multiplied by the above-mentioned weight values W1-W3 in multipliers 371-373, to thereby demodulate the paths 1-3. Complex multiplication is performed because a multi-path contains a phase rotating component. The demodulated data of paths 1-3 are added in the adder 38, and outputted as a final demodulated data to the soft decision unit 26.

According to the RAKE synthesizer apparatus 25 configured as above described, when the SIR average value of multi-paths is larger than the reference value, the coefficient becomes smaller than 1, and the weight value W is automatically lowered. As a result, the average power level of the demodulated data lowers, and the average of soft decision values decreases. Contrarily, when the SIR average value of paths 1-3 is smaller than the reference value, the coefficient becomes larger than 1 and the weight value W automatically increases. As a result, the average power level of the demodulated data rises, and the average of soft decision value increases. Namely, the amplitude of the demodulated data is controlled so that the average of soft decision value becomes optimum by the weighing depending on the SIR average value of multi-paths.

Figure 5:
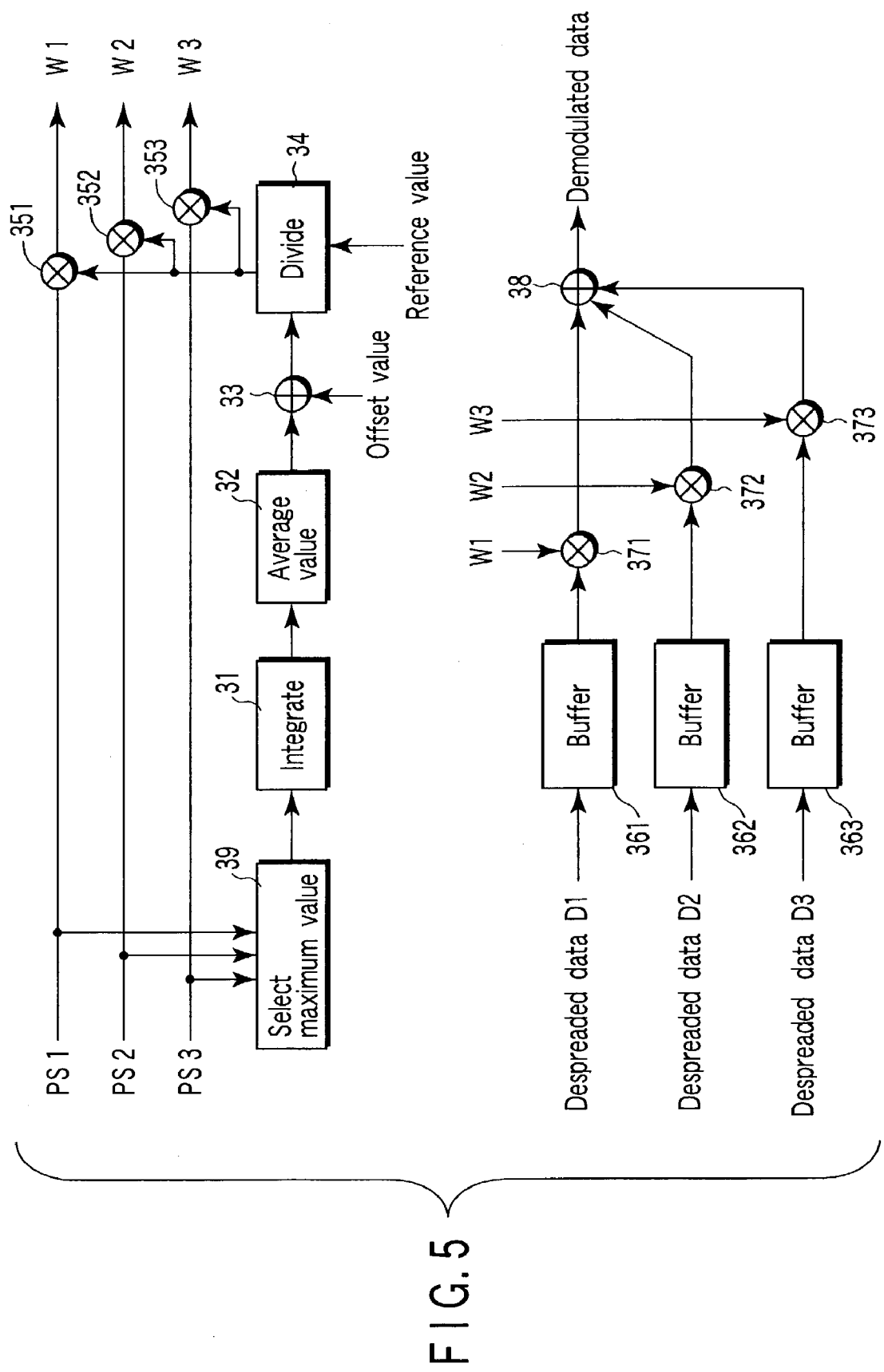
FIG. 5 is a block diagram showing another configuration example of a RAKE synthesizer apparatus used in the above embodiment.

FIG. 5 is a block diagram showing another configuration example of the above-mentioned RAKE synthesizer apparatus 25. In FIG. 5, the same reference numerals are given to the same components as those in FIG. 4. In the configuration of FIG. 4, the SIR values PS1-PS3 of paths 1-3 inputted from the transmission path estimator 23 are accumulated in the integrator 31, and an average value for sufficiently long period is calculated by the average value calculator 32. Contrarily, in the configuration of FIG. 5, the maximum value selector 39 selects the SIR value which takes the maximum power value among SIR values PS1-PS3 of paths 1-3, and this SIR value is accumulated at every cycle of a pilot signal in the integrator 31, and an average value for sufficiently long period is calculated by the average value calculator 32.

For example, in the case of multi-path shown in FIG. 3, only the SIR value PS1 of path 1 (PS1=P1/(P2 +P3)) is selected, and accumulated in the integrator 31. This reduces the averaging process. The following process is the same as in the example shown in FIG. 4. This example is useful in the environment where the correlative power of one path is larger than that of another path (e.g., the environment where a direct wave exists).

As above described, in the CDM receiver apparatus of the above-mentioned embodiment, the SIR value of each multi-path obtained by the transmission path estimator 23 is multiplied by the coefficient inversely proportional to the long time average, and RAKE is synthesized by weighing the despreaded demodulated data by the multiplied value as a weight value of each path. Thus, it becomes possible to control the average input value to the soft decision unit 26 to be optimum.

Particularly, when calculating the coefficient which is multiplied for the SIR value of each path of multi-paths obtained in the transmission path estimator 23, as shown in FIG. 5, the averaging process can be reduced by using the long time average of the SIR value of the path having the maximum electric power among multi-paths.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A CDM receiver apparatus which receives a CDM (Code Division Multiplex) radio signal obtained by encoding each information/data signal of a plurality of channels for correction of an error and despreading, modulating and multiplying each signal by using a spreading code different for each channel, comprising:
   a receiver which receives a CDM radio signal;
   a frequency converter which converts the CDM radio signal into a base band CDM signal;
   a transmission path estimator which estimates multi-path characteristics of a transmission path from the base band CDM signal, selects a plurality of paths from the result of estimation, and obtains a delay time and a signal-to-interference ratio for each path;
   a despreading unit which shifts the phase of the spreading code of a specified channel out of the spreading codes, based on the delay time of the corresponding path obtained by the transmission path estimator, with respect to the plurality of paths selected by the transmission path estimator, and despreads the base band CDM signal to obtain despreaded data;
   a weight value generator which accumulates and averages signal-to-interference ratios of a plurality of paths obtained by the transmission path estimator, to obtain an average value, and multiplies the signal-to-interference ratio of the plurality of paths by a coefficient inversely proportional to the average value, to obtain a weight value for each path;
   a synthesizer which obtains demodulated data by synthesizing the despreaded data of the plurality of paths obtained by the despreading unit, by weighing by the weight value of the corresponding path; and
   a soft decision decoder which obtains decoded data by soft decision decoding the demodulated data obtained by the synthesizer,
   wherein when a pilot signal generated by repeating a string of known data at a prefixed cycle is spread and modulated to the CDM radio signal by a spreading code different from a spreading code for the information/data signal, and multiplexed to the spread modulated signal of the information/data signal, the transmission path estimator correlates with the base band CDM signal by the spreading code for the pilot signal, and obtains a delay time of multi-path occurred in a radio transmission path and a signal-to-interference ratio signal, from the result of correlation; and
   the weight value generator accumulates the signal-to-interference ratios of the plurality of paths obtained by the transmission path estimator, at every cycle of the pilot signal.

2. The apparatus according to claim 1, wherein the weight value generator calculates a coefficient inversely proportional to the average value of the signal-to-interference ratios, on the basis of the signal-to-interference ratio with which the average of the soft decision value of the soft decision decoder becomes optimum.

3. The apparatus according to claim 1, wherein the weight value generator calculates the average value of the signal-to-interference ratios by accumulating the signal-to-interference ratios for each path of the plurality of paths selected by the transmission path estimator.

4. The apparatus according to claim 1, wherein the weight value generator calculates the average value of the signal-to-interference ratios by selecting and accumulating a signal-to-interference ratio of a path which takes a maximum electric power value, out of the plurality of paths selected by the transmission path estimator.

5. A RAKE synthesizer apparatus comprising:
   a weight value generator which calculates a weight value for each path by accumulating and averaging signal-to-interference ratios of a plurality of paths obtained by the transmission path estimator, to obtain an average value, and multiplying the signal-to-interference ratios of the plurality of paths by a coefficient inversely proportional to the average value; and
   a synthesizer which obtains demodulated data by synthesizing the despreaded data of a plurality of paths obtained by the despreading unit by weighing by the weight value of the corresponding path,
   wherein when a pilot signal generated by repeating a string of known data at a prefixed cycle is spread and modulated to the CDM radio signal by a spreading code different from a spreading code for the information/data signal, and multiplexed to the spread modulated signal of the information/data signal, and the transmission path estimator correlates with the base band CDM signal by the spreading code for the pilot signal, and obtains a delay time of multi-path occurred in a radio transmission path and a signal-to-interference ratio signal, from the result of correlation;
   the weight value generator accumulates the signal-to-interference ratios of the plurality of paths obtained by the transmission path estimator, at every cycle of the pilot signal.

6. The apparatus according to claim 5, wherein the weight value generator calculates a coefficient inversely proportional to the average value of the signal-to-interference ratios, on the basis of a signal-to-interference ratio with which the average of the soft decision value of the soft decision decoder becomes optimum.

7. The apparatus according to claim 5, wherein the weight value generator calculates the average value of the signal-to-interference ratios by accumulating the signal-to-interference ratios for each path of the plurality of paths selected by the transmission path estimator.

8. The apparatus according to claim 5, wherein the weight value generator calculates the average value of the signal-to-interference ratios by selecting and accumulating a signal-to-interference ratio of a path which takes a maximum electric power value, among the plurality of paths selected by the transmission path estimator.

* * * * *